United States Patent
Byun et al.

(10) Patent No.: US 9,734,792 B2
(45) Date of Patent: Aug. 15, 2017

(54) DISPLAY DEVICE INCLUDING RESET CONTROLLING UNIT AND METHOD OF DRIVING THE SAME

(71) Applicant: LG DISPLAY CO., LTD., Seoul (KR)

(72) Inventors: Seog-Gyu Byun, Goyang-si (KR); Kyu-Yeon Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/066,114

(22) Filed: Oct. 29, 2013

(65) Prior Publication Data

US 2014/0118329 A1 May 1, 2014

(30) Foreign Application Priority Data

Oct. 31, 2012 (KR) .......................... 10-2012-0122553

(51) Int. Cl.
*G06F 13/14* (2006.01)
*G09G 5/00* (2006.01)

(52) U.S. Cl.
CPC ............. *G09G 5/006* (2013.01); *G06F 13/14* (2013.01); *G09G 2320/0247* (2013.01); *G09G 2320/0257* (2013.01); *G09G 2330/02* (2013.01); *G09G 2370/22* (2013.01)

(58) Field of Classification Search
CPC ........... G09G 2370/20; G09G 2370/22; G09G 13/00; G06F 1/26
See application file for complete search history.

(56) References Cited

U.S. PATENT DOCUMENTS

| 8,930,730 B2* | 1/2015 | Kim | G09G 5/006 710/305 |
| 2002/0118150 A1* | 8/2002 | Kwon | G09G 3/3233 345/76 |
| 2004/0017344 A1* | 1/2004 | Takemoto | G09G 3/3614 345/87 |
| 2008/0152023 A1* | 6/2008 | Yoshida | G09G 5/006 375/257 |
| 2009/0051693 A1* | 2/2009 | Rokushima | G09G 5/006 345/520 |
| 2009/0289932 A1* | 11/2009 | Nishi | G09G 3/3648 345/212 |

(Continued)

FOREIGN PATENT DOCUMENTS

| TW | 506219 B | 10/2002 |
| TW | 200816636 A | 4/2008 |
| TW | 200941429 A | 10/2009 |

OTHER PUBLICATIONS

Office Action dated Oct. 15, 2015 for corresponding Taiwanese Patent Application No. 102139343, 9 pages.

*Primary Examiner* — Jennifer Mehmood
*Assistant Examiner* — Carl Adams
(74) *Attorney, Agent, or Firm* — Brinks Gilson & Lione

(57) ABSTRACT

A display device includes: an interfacing unit for converting one of a plurality of image signals inputted according to a switch among a plurality of input modes into an image data; a first reset controlling unit for resetting the interfacing unit according to the switch among the plurality of input modes; a driving unit for converting the image data into a data signal; a display panel for displaying an image using the data signal; and a panel power unit for supplying a panel power to the driving unit and the display panel.

14 Claims, 4 Drawing Sheets

(56) References Cited

U.S. PATENT DOCUMENTS

| | | | | |
|---|---|---|---|---|
| 2010/0013675 A1* | 1/2010 | Bennett | ................ | G06F 3/038 |
| | | | | 341/5 |
| 2011/0197001 A1* | 8/2011 | Hsieh | ................ | G06F 13/42 |
| | | | | 710/110 |
| 2011/0316805 A1* | 12/2011 | Yamada | ................ | G06F 3/038 |
| | | | | 345/173 |
| 2012/0226921 A1* | 9/2012 | Kim | ................ | G09G 5/006 |
| | | | | 713/310 |
| 2012/0274857 A1* | 11/2012 | Maxwell | ................ | H04L 12/12 |
| | | | | 348/720 |

* cited by examiner

DISPLAY DEVICE INCLUDING RESET CONTROLLING UNIT AND METHOD OF DRIVING THE SAME

CROSS REFERENCE TO RELATED APPLICATIONS

The present application claims the benefit of priority of Korean Patent Application No. 10-2012-0122553 filed in the Republic of Korea on Oct. 31, 2012, which is hereby incorporated by reference in its entirety.

FIELD OF THE DISCLOSURE

The present disclosure relates to a display device. The present disclosure also relates to a display device where deterioration such as a flicker and a residual image is prevented due to a reset controlling unit and a method of driving the display device.

DISCUSSION OF THE RELATED ART

Although a cathode ray tube (CRT) has been the mainstream of display devices transmitting image information, a flat panel display (FPD) has been recently suggested to meet the demand of the times such as a small size, a light weight, a thin profile and a low power consumption. For example, the FPD may include a liquid crystal display (LCD) device, a plasma display panel (PDP), a field emission display (FED) device and an organic light emitting diode (OLED) display device.

The LCD device is a non-emissive device where an image is displayed using transmittance difference of a liquid crystal layer between facing two substrates due to application of an electric field. An active matrix LCD (AMLCD) has been widely used as the LCD device.

The OLED display device is an emissive device where an image is displayed using a light emitted from an emission layer due to application of a current. The OLED display device has advantages such as high contrast ratio and short response time.

The display device displays an image by converting an image signal inputted from an external system into a usable image data. The image display of the display device will be illustrated hereinafter with reference to a drawing.

FIG. 1 is a view showing a structure of a display device according to the related art.

In FIG. 1, a display device 10 according to the related art includes a display panel 20, a driving unit 30, an interfacing unit 40 and a panel power unit 42. The display panel 20 displays an image using a panel driving signal PDS corresponding to image signals IS1 and IS2 inputted from an external system (not shown). The display panel 20 includes a plurality of pixels (not shown). The driving unit 30 generates the panel driving signal PDS corresponding to the image signals IS1 and IS2 and supplies the panel driving signal PDS to the display panel 20. The panel driving signal PDS includes a data signal applied to the plurality of pixels of the display panel 20.

The interfacing unit 40 receives the image signals IS1 and IS2 from the external system and converts the images signals IS1 and IS2 into an image data RGB usable in the display panel 20. The interfacing unit 40 supplies the image data RGB to the driving unit 30. The panel power unit 42 supplies a panel power VPP, which is used as a source voltage in the display panel 20 and the driving unit 30, to the driving unit 30.

In the display device 10 according to the related art, the image signals IS1 and IS2 of the external system are inputted into the interfacing unit 40 and are converted into the image data RGB. The image data RGB is transmitted to the driving unit 30 and is converted into the data signal of the panel driving signal PDS. The data signal is transmitted to the display panel 20 and the display panel 20 displays the image by applying the data signal to each pixel.

The display panel 10 according to the related art receives the image signals IS1 and IS2 through various methods according to an input mode. For example, the display device 10 may display the image by using the first image signal IS1 received in a wireless input mode or the second image signal IS2 received in a universal serial bus (USB) input mode.

The input mode of the display device 10 may be switched between the wireless input mode and the USB input mode according to user's selection. In the wireless input mode, when the interfacing unit 40 receives the first image signal IS1, the interfacing unit 40 outputs the image data RGB converted from the first image signal IS1. In the USB input mode, when the interfacing unit 40 receives the second image signal IS2 with a bus signal VBUS of about 5V which is determined as a standard input/output, the interfacing unit 40 converts the second image signal IS2 into the image data RGB and outputs the image data RGB.

As a result, when the input mode is switched in the display device 10, errors may occur in the conversion process of the image signals IS1 and IS2 in the interfacing unit 40 according to existence or nonexistence of the bus signal VBUS. In addition, the errors may cause deterioration such as a flicker to degrade display quality of the display device 10.

When the wireless input mode is switched to the USB input mode, the first image signal IS1 inputted in the wireless input mode and the second image signal inputted in the USB input mode may coexist in the interfacing unit 40 at an early stage of the switch operation. Since the bus signal VBUS is inputted to the interfacing unit 40, the second image signal IS2 is normally converted into the image data RGB. However, the first image signal IS1 is not normally converted into the image data RGB due to existence of the bus signal VBUS and the conversion errors occur.

In addition, when the USB input mode is switched to the wireless input mode, the second image signal IS2 inputted in the USB input mode and the first image signal IS1 inputted in the wireless input mode may coexist in the interfacing unit 40 at an early stage of the switch operation. Since the bus signal VBUS is not inputted to the interfacing unit 40, the first image signal IS1 is normally converted into the image data RGB. However, the second image signal IS2 is not normally converted into the image data RGB due to nonexistence of the bus signal VBUS and the conversion errors occur.

Further, in the display device 10 according to the related art, input of the image signals IS1 and IS2 to the interfacing unit 40 may abnormally stop. For example, when a signal cable transmitting the image signals IS1 and IS2 is cut or errors occur in input terminals of the interfacing unit 40, the input of the image signals IS1 and IS2 may abnormally stop.

Here, since the image signals IS1 and IS2 are not inputted, the conversion process in the interfacing unit 40 stops and the output of the image data RGB from the interfacing unit 40 stops. However, since the input of the image signals IS1 and IS2 abnormally stops, the panel power unit 42, which does not perceive the abnormal stop, consistently supplies the panel power VPP to the driving unit 30. As a result, the display panel 20 displays a residual image of the previous frames and the residual image causes deterioration such as a noise to degrade the display quality of the display panel 10.

SUMMARY

A display device includes an interfacing unit that converts one of a plurality of image signals inputted according to a switch among a plurality of input modes into an image data; a first reset controlling unit that resets the interfacing unit according to the switch among the plurality of input modes; a driving unit that converts the image data into a data signal; a display panel that displays an image using the data signal; and a panel power unit that supplies a panel power to the driving unit and the display panel.

In another aspect, there is provided a method of driving a display device including: converting one of a plurality of image signals inputted according to a switch among a plurality of input modes into an image data by an interfacing unit; resetting the interfacing unit according to the switch among the plurality of input modes to eliminate the plurality of image signals coexisting in the interfacing unit by a reset controlling unit; converting the image data into a data signal by a driving unit; displaying an image using the data signal by a display panel; and supplying a panel power to the driving unit and the display panel by a panel power unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the preferred embodiments, examples of which are illustrated in the accompanying drawings.

Figure 1:
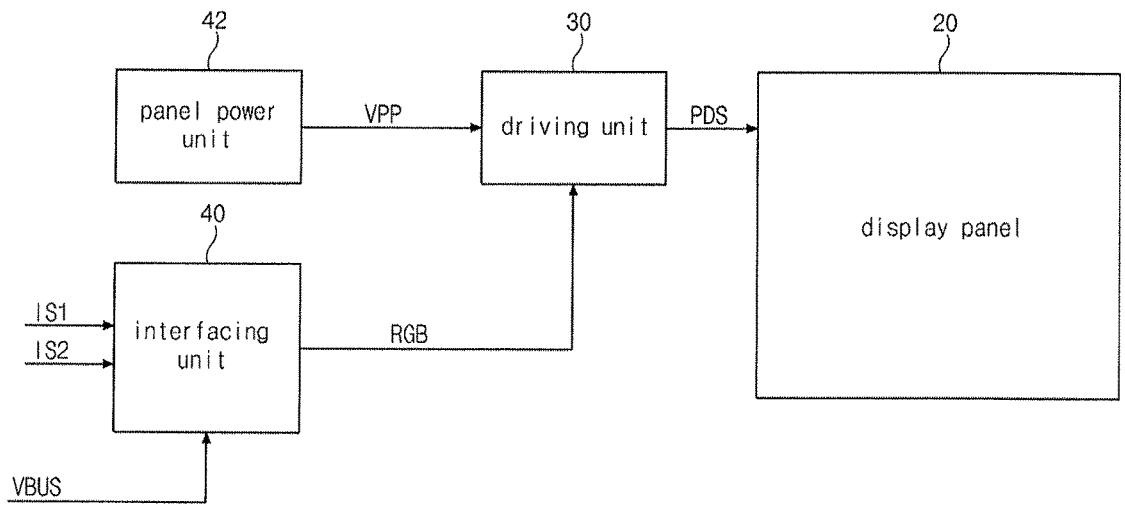
FIG. 1 is a view showing a structure of a display device according to the related art.
Figure 2:
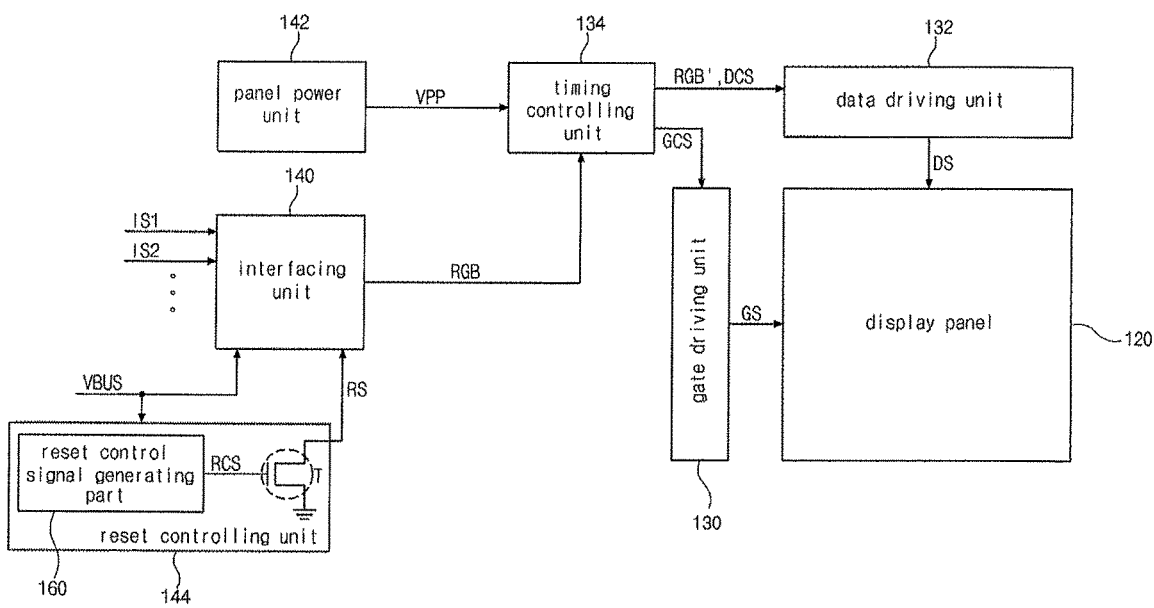
FIG. 2 is a view showing a structure of a display device according to a first embodiment of the present invention.
Figure 3:
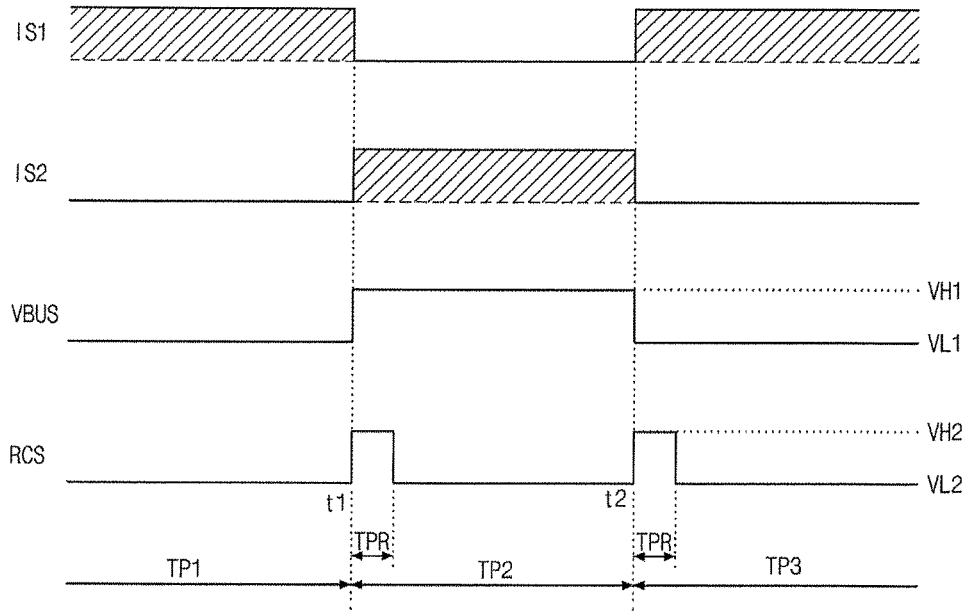
FIG. 3 is a timing chart showing a plurality of signals for a display device according to a first embodiment of the present invention.

FIG. 2 is a view showing a structure of a display device according to a first embodiment of the present invention, and FIG. 3 is a timing chart showing a plurality of signals for a display device according to a first embodiment of the present invention.

In FIG. 2, a display device 110 according to a first embodiment of the present invention includes a display panel 120, a gate driving unit 130, a data driving unit 132, a timing controlling unit 134, an interfacing unit 140, a panel power unit 142 and a reset controlling unit 144.

The display panel 120 may display an image corresponding to one of a plurality of image signals IS1 and IS2 inputted from an external system (not shown) using a gate signal GS and a data signal DS. Although not shown, the display panel 120 may include a plurality of pixels defined by a plurality of gate lines and a plurality of data lines crossing each other.

The gate driving unit 130 may generate the gate signal GS using a gate control signal GCS and may output the gate signal GS to the display panel 120. The data driving unit 132 may generate the data signal DS using a rearranged image data RGB' and a data control signal DCS and may output the data signal DS to the display panel 120.

The timing controlling unit 134 may generate the rearranged image data RGB', the gate control signal GCS and the data control signal DCS using an image data RGB and a plurality of timing signals such as data enable (DE) signal, a horizontal synchronization (HSY) signal, a vertical synchronization (VSY) signal and a clock (CLK) signal. The timing controlling unit 134 may output the gate control signal GCS to the gate driving unit 130 and may output the rearranged image data RGB' and the data control signal DCS to the data driving unit 132. Here, the gate driving unit 130, the data driving unit 132 and the timing controlling unit 134 constitute a driving portion of the display device 110.

The interfacing unit 140 may selectively receive one of the plurality of image signals IS1 and IS2 from the external system such as a television system or a graphic card. The interfacing unit 140 may convert the one of the plurality of image signals IS1 and IS2 into the image data RGB having a signal type usable in the timing controlling unit 134, the gate driving unit 130, the data driving unit 132 and the display panel 120 and may output the image data RGB to the timing controlling unit 134. For example, the image data RGB outputted from the interfacing unit 140 may include a low voltage differential signaling (LVDS) signal.

The plurality of image signals IS1 and IS2 may be inputted through a plurality of input modes different from each other. For example, the plurality of input modes may include a wireless input mode, a universal serial bus (USB) input mode, an analog/digital RGB input mode, a high definition multimedia interface (HDMI) input mode, a D-subminiature (SUB) input mode, a composite input mode and a component input mode. In addition, the wireless input mode may have one of an ultra wide band (UWB), a wireless high definition (HD) and a wireless fidelity (WiFi) display.

When a user selects one of the plurality of input modes, a corresponding one of the plurality of image signals IS1 and IS2 may be inputted. While an image is displayed using the corresponding one of the plurality of image signals IS1 and IS2, the user may select another of the plurality of input modes. As a result, a switch in input mode between the plurality of image signals IS1 and IS2 may occur.

The panel power unit 142 may output a panel power VPP, which is used as a source voltage in the timing controlling unit 134, the gate driving unit 130, the data driving unit 132 and the display panel 120, to the timing controlling unit 134.

When the switch in input mode between the plurality of image signals IS1 and IS2 occurs, the reset controlling unit 144 may reset the interfacing unit 140 to prevent errors of the interfacing unit 140. The reset controlling unit 144 may include a reset control signal generating part 160 which generates a reset control signal RCS corresponding to the switch in input mode between the plurality of image signals IS1 and IS2 and a transistor T which outputs a reset signal RS to the interfacing unit 140 according to the reset control signal RCS.

For example, in the wireless input mode, the interfacing unit 140 may receive the first image signal IS1 and may output the image data RGB converted from the first image signal IS1. In the USB input mode, the interfacing unit 140 may receive the second image signal IS2 and may output the image data RGB converted from the second image signal IS2. When the switch in input mode between the first and second image signals IS1 and IS2 occurs, the reset controlling unit 144 may reset the interfacing unit 140 using a bus signal VBUS of about 5V which is determined as a standard input/output inputted with the second image signal IS2 in the USB input mode.

In FIG. 3, when the display device 110 is switched from the wireless input mode to the USB input mode and then is switched from the USB input mode to the wireless input mode, the first image signal IS1 is inputted to the interfacing unit 140 during first and third time periods TP1 and TP3, and the second image signal IS2 and the bus signal VBUS are inputted to the interfacing unit 140 during the second time period TP2.

The bus signal VBUS has a first low level voltage VL1 during the first and third time periods TP1 and TP3 and has a first high level voltage VH1 during the second time period TP2. The bus signal VBUS increases from the first low level voltage VL1 to the first high level voltage VH1 at a first timing t1 where the wireless input mode is switched into the USB input mode and decreases from the first high level voltage VH1 to the first low level voltage VL1 at a second timing t2 where the USB input mode is switched to the wireless input mode.

The reset control signal generating part 160 generates the reset control signal RCS having a pulse shape synchronized with the first and second timings t1 and t2 that are rising and falling timings, respectively, of the bus signal VBUS. For example, the reset control signal RCS may have a second high level voltage VH2 during a reset time period TPR at the first and second timings t1 and t2 and may have a second low level voltage VL2 during the other time period.

The reset control signal RCS is applied to the transistor T. The transistor T may include a field effect transistor where the reset control signal RCS is applied to a gate and a drain and a source are connected to a reset input terminal of the interfacing unit 140 and a ground voltage terminal, respectively. Alternatively, the transistor T may include a bipolar junction transistor where the reset control signal RCS is applied to a base and a collector and an emitter are connected to a reset input terminal of the interfacing unit 140 and a ground voltage terminal, respectively. Accordingly, the transistor T is turned on during the reset time period TPR where the reset control signal has the second high level voltage VH2 to input a ground voltage as the reset signal RS to the reset input terminal of the interfacing unit 140. As a result, the interfacing unit 140 is reset during the reset time period TPR.

For example, the interfacing unit 140 may have an integrated circuit (IC) and a general purpose input output (GPIO) of IC may be used as the reset input terminal for the reset signal RS.

Since the interfacing unit 140 is reset during the reset time period TPR right after the switch from the wireless input mode to the USB input mode and the reset time period TPR right after the switch from the USB input mode to the wireless input mode, the first and second image signals IS1 and IS2 coexisting in the interfacing unit 140 at an early stage of the switch operation are eliminated and the errors are prevented in the conversion process to the image data RGB. As a result, deterioration such as a flicker is prevented and display quality of the display device 110 is improved.

Although the switch between the wireless input mode and the USB input mode is exemplarily illustrated in the first embodiment, deterioration such as a flicker may be prevented by resetting the interfacing unit 140 at the early stage of the switch operation among the analog/digital RGB input mode, the HDMI input mode, the D-SUB input mode, the composite input mode and the component input mode in another embodiment.

In another embodiment, when the input of the image signal stops, the panel power unit may be reset. The image display of the display device will be illustrated hereinafter with reference to drawings.

Figure 4:
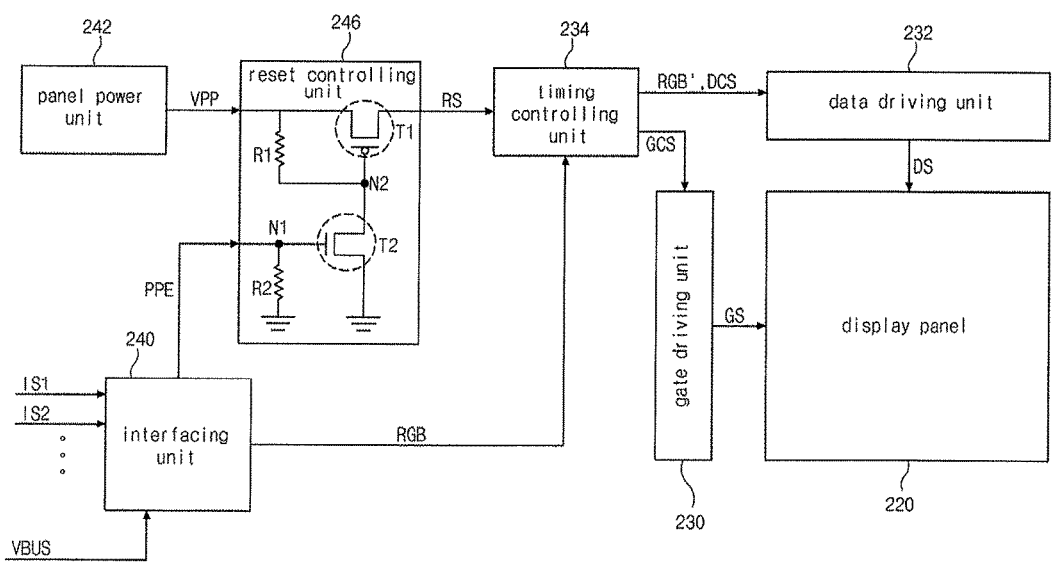
FIG. 4 is a view showing a structure of a display device according to a second embodiment of the present invention.
Figure 5:
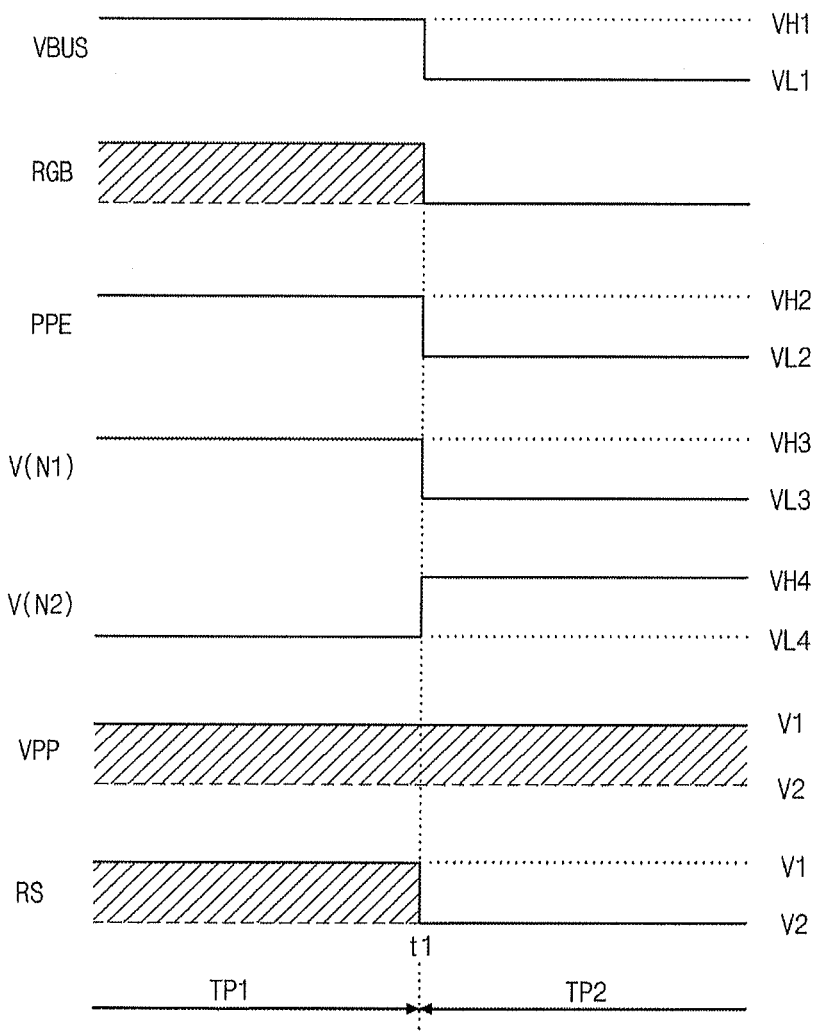
FIG. 5 is a timing chart showing a plurality of signals for a display device according to a second embodiment of the present invention.

FIG. 4 is a view showing a structure of a display device according to a second embodiment of the present invention, and FIG. 5 is a timing chart showing a plurality of signals for a display device according to a second embodiment of the present invention.

In FIG. 4, a display device 210 according to a second embodiment of the present invention includes a display panel 220, a gate driving unit 230, a data driving unit 232, a timing controlling unit 234, an interfacing unit 240, a panel power unit 242 and a reset controlling unit 246.

The display panel 220 may display an image corresponding to one of a plurality of image signals IS1 and IS2 inputted from an external system (not shown) using a gate signal GS and a data signal DS. Although not shown, the display panel 220 may include a plurality of pixels defined by a plurality of gate lines and a plurality of data lines crossing each other.

The gate driving unit 230 may generate the gate signal GS using a gate control signal GCS and may output the gate signal GS to the display panel 220. The data driving unit 232 may generate the data signal DS using a rearranged image data RGB' and a data control signal DCS and may output the data signal DS to the display panel 220.

The timing controlling unit 234 may generate the rearranged image data RGB', the gate control signal GCS and the data control signal DCS using an image data RGB and a plurality of timing signals such as data enable (DE) signal, a horizontal synchronization (HSY) signal, a vertical synchronization (VSY) signal and a clock (CLK) signal. The timing controlling unit 234 may output the gate control signal GCS to the gate driving unit 230 and may output the rearranged image data RGB' and the data control signal DCS to the data driving unit 232. Here, the gate driving unit 230, the data driving unit 232 and the timing controlling unit 234 constitute a driving portion of the display device 210.

The interfacing unit 240 may selectively receive one of the plurality of image signals IS1 and IS2 from the external system such as a television system or a graphic card. The interfacing unit 240 may convert the one of the plurality of image signals IS1 and IS2 into the image data RGB having a signal type usable in the timing controlling unit 234, the gate driving unit 230, the data driving unit 232 and the display panel 220 and may output the image data RGB to the timing controlling unit 234. For example, the image data RGB outputted from the interfacing unit 240 may include a low voltage differential signaling (LVDS) signal.

In addition, the interfacing unit 240 may generate a panel power enable signal PPE corresponding to a state of input or no input of one of the plurality of image signals IS1 and IS2 and may output the panel power enable signal PPE to the reset controlling unit 246. For example, the interfacing unit 240 may have an integrated circuit (IC) and a general purpose input output (GPIO) of IC may be used as an output terminal of the panel power enable signal PPE.

The plurality of image signals IS1 and IS2 may be inputted through a plurality of input modes different from each other. For example, the plurality of input modes may include a wireless input mode, a universal serial bus (USB) input mode, an analog/digital RGB input mode, a high definition multimedia interface (HDMI) input mode, a D-subminiature (SUB) input mode, a composite input mode and a component input mode. In addition, the wireless input mode may have one of an ultra wide band (UWB), a wireless high definition (HD) and a wireless fidelity (WiFi) display.

When a user selects one of the plurality of input modes, a corresponding one of the plurality of image signals IS1 and IS2 may be inputted. While an image is displayed using the corresponding one of the plurality of image signals IS1 and IS2, the user may select another of the plurality of input modes. As a result, a switch in input mode between the plurality of image signals IS1 and IS2 may occur.

The panel power unit 242 may output a panel power VPP, which is used as a source voltage in the timing controlling unit 234, the gate driving unit 230, the data driving unit 232 and the display panel 220, to the reset controlling unit 246.

When the one of the plurality of image signals IS1 and IS2 stops, the reset controlling unit 246 may reset the display panel 220 by blocking the panel power VPP to prevent noises of the display panel 220. The reset controlling unit 246 may include a panel power switching part which generates a reset signal RS by transmitting or blocking the panel power VPP and a switching controlling part which adjusts the panel power switching part according to the panel power enable signal PPE.

For example, the panel power switching part may include a first transistor T1 of a positive type and a first resistor R1, and the switching controlling part may include a second transistor T2 of a negative type and a second resistor R2. The first resistor R1 is connected between a gate and a source of the first transistor T1. The source of the first transistor T1 is connected to a first input terminal of the reset controlling unit 246 for the panel power VPP and a drain of the first transistor T1 is connected to a first output terminal of the reset controlling unit 246 for the reset signal RS. In addition, the second resistor R2 is connected between a gate of the second transistor T2 and a ground voltage terminal. A source of the second transistor T2 is connected to the ground voltage terminal and a drain of the second transistor T2 is connected to the gate of the first transistor T1. The gate of the second transistor T2 is connected to a second input terminal of the reset controlling unit 246 for the panel power enable signal PPE.

Although the first and second transistors T1 and T2 include a field effect transistor (FET) in the second embodiment, the first and second transistors T1 and T2 may include a bipolar junction transistor (BJT) in another embodiment.

For example, in the USB input mode, the interfacing unit 240 may receive the second image signal IS2 and may output the image data RGB converted from the second image signal IS2. In addition, the interfacing unit 240 may generate the panel power enable signal PPE corresponding to a BUS signal VBUS of about 5V which is determined as a standard input/output inputted with the second image signal IS2 in the USB input mode and may output the panel power enable signal PPE to the reset controlling unit 246. When the input of the second image signal IS2 abnormally stops, the reset controlling unit 246 may reset the display panel 220 using the panel power enable signal PPE.

In FIG. 5, during a first time period TP1 where the second image signal IS2 is normally inputted in the USB input mode, the bus signal VBUS has a first high level voltage VH1 and the interfacing unit 240 normally outputs the image data RGB. In addition, the panel power enable signal PPE corresponding to the bus signal VBUS has a second high level voltage VH2. Accordingly, a first node N1 between the gate of the second transistor T2 and the second resistor R2 where the panel power enable signal PPE is applied has a third high level voltage VH3 and the second transistor T2 is turned on. As a result, the ground voltage of the source of the second transistor T2 is applied to the gate of the first transistor T1 and a second node N2 between the drain of the second transistor T2 and the gate of the first transistor T1 has a fourth low level voltage VL4.

Consequently, during the first time period TP1, the first transistor T1 is turned on and a first voltage V1 of the panel power VPP of the source of the first transistor T1 is transmitted to the drain of the first transistor T1. As a result, the reset signal RS outputted from the reset controlling unit 246 has the first voltage V1 and the display panel 220 normally displays an image using the first voltage V1.

During a second time period TP2 after the input of the second image signal IS2 abnormally stops at a first timing t1 in the USB input mode, the bus signal VBUS has a first low level voltage VL1 and the output of the image data RGB from the interfacing unit 240 abnormally stops. In addition, the panel power enable signal PPE corresponding to the bus signal VBUS has a second low level voltage VL2. Accordingly, the first node N1 between the gate of the second transistor T2 and the second resistor R2 where the panel power enable signal PPE is applied has a third low level voltage VL3 and the second transistor T2 is turned off. As a result, the second node N2 between the drain of the second transistor T2 and the gate of the first transistor T1 has a fourth high level voltage VH4.

Consequently, during the second time period TP1, the first transistor T1 is turned off and the first voltage V1 of the panel power VPP of the source of the first transistor T1 is not transmitted to the drain of the first transistor T1. As a result, the reset signal RS outputted from the reset controlling unit 246 has a second voltage V2 lower than the first voltage V1 and the first voltage corresponding to the panel power VPP is not supplied to the display panel 220. For example, the first and second voltages may be about 12V and about 0V, respectively.

Since the reset controlling unit 246 blocks transmission of the panel power VPP to the display panel 220 even when the output of the image data RGB from the interfacing unit 240 abnormally stops due to abnormal stop of the second image signal IS2, a residual image of a previous frame is not displayed in the display panel 220. Accordingly, deterioration such as a noise is prevented and display quality of the display device 210 is improved.

Although abnormal stop of the input of the second image signal IS2 in the USB input mode is exemplarily illustrated in the second embodiment, deterioration such as a noise may be prevented by resetting the display panel 220 and blocking the panel power VPP even when input of an image signal in one of the analog/digital RGB input mode, the HDMI input mode, the D-SUB input mode, the composite input mode and the component input mode abnormally stops in another embodiment.

In another embodiment, when the input of the image signal is switched or abnormally stops, the interfacing unit or the display panel may be reset. The image display of the display device will be illustrated hereinafter with reference to drawings.

Figure 6:
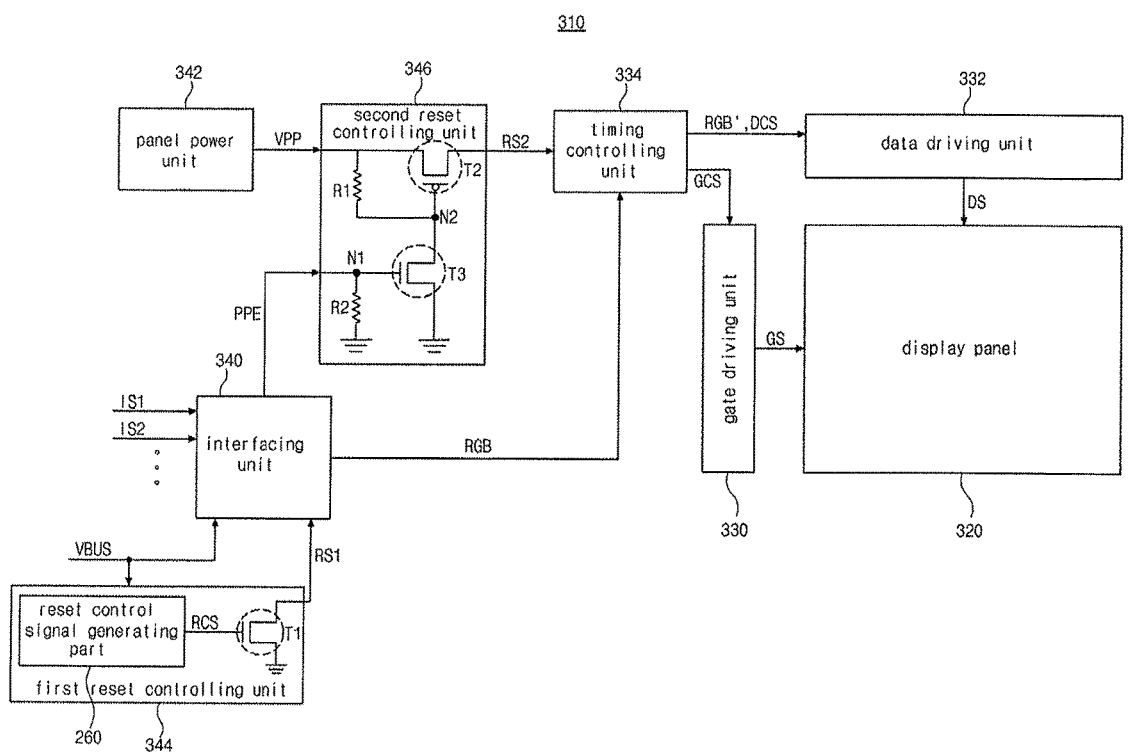
FIG. 6 is a view showing a structure of a display device according to a third embodiment of the present invention.

FIG. 6 is a view showing a structure of a display device according to a third embodiment of the present invention.

In FIG. 6, a display device 310 according to a third embodiment of the present invention includes a display panel 320, a gate driving unit 330, a data driving unit 332, a timing controlling unit 334, an interfacing unit 340, a panel power unit 342, a first reset controlling unit 344 and a second reset controlling unit 346.

The display panel 320 may display an image corresponding to one of a plurality of image signals IS1 and IS2 inputted from an external system (not shown) using a gate signal GS and a data signal DS. Although not shown, the display panel 220 may include a plurality of pixels defined by a plurality of gate lines and a plurality of data lines crossing each other.

The gate driving unit 330 may generate the gate signal GS using a gate control signal GCS and may output the gate signal GS to the display panel 320. The data driving unit 332 may generate the data signal DS using a rearranged image data RGB' and a data control signal DCS and may output the data signal DS to the display panel 320.

The timing controlling unit 334 may generate the rearranged image data RGB', the gate control signal GCS and the data control signal DCS using an image data RGB and a plurality of timing signals such as data enable (DE) signal, a horizontal synchronization (HSY) signal, a vertical synchronization (VSY) signal and a clock (CLK) signal. The timing controlling unit 334 may output the gate control signal GCS to the gate driving unit 330 and may output the rearranged image data RGB' and the data control signal DCS to the data driving unit 332. Here, the gate driving unit 330, the data driving unit 332 and the timing controlling unit 334 constitute a driving portion of the display device 310.

The interfacing unit 340 may selectively receive one of the plurality of image signals IS1 and IS2 from the external system such as a television system or a graphic card. The interfacing unit 340 may convert the one of the plurality of image signals IS1 and IS2 into the image data RGB having a signal type usable in the timing controlling unit 334, the gate driving unit 330, the data driving unit 332 and the display panel 320 and may output the image data RGB to the timing controlling unit 334. For example, the image data RGB outputted from the interfacing unit 340 may include a low voltage differential signaling (LVDS) signal.

The plurality of image signals IS1 and IS2 may be inputted through a plurality of input modes different from each other. For example, the plurality of input modes may include a wireless input mode, a universal serial bus (USB) input mode, an analog/digital RGB input mode, a high definition multimedia interface (HDMI) input mode, a D-subminiature (SUB) input mode, a composite input mode and a component input mode. In addition, the wireless input mode may have one of an ultra wide band (UWB), a wireless high definition (HD) and a wireless fidelity (WiFi) display.

When a user selects one of the plurality of input modes, a corresponding one of the plurality of image signals IS1 and IS2 may be inputted. While an image is displayed using the corresponding one of the plurality of image signals IS1 and IS2, the user may select another of the plurality of input modes. As a result, a switch in input mode between the plurality of image signals IS1 and IS2 may occur.

In addition, the interfacing unit 340 may generate a panel power enable signal PPE corresponding to a state of input or no input of one of the plurality of image signals IS1 and IS2 and may output the panel power enable signal PPE to the second reset controlling unit 346. For example, the interfacing unit 340 may have an integrated circuit (IC) and a general purpose input output (GPIO) of IC may be used as an output terminal for the panel power enable signal PPE.

The panel power unit 342 may output a panel power VPP, which is used as a source voltage in the timing controlling unit 334, the gate driving unit 330, the data driving unit 332 and the display panel 320, to the second reset controlling unit 346.

When the switch in input mode between the plurality of image signals IS1 and IS2 occurs, the first reset controlling unit 344 may reset the interfacing unit 340 to prevent errors of the interfacing unit 340. The first reset controlling unit 344 may include a reset control signal generating part 360 which generates a reset control signal RCS corresponding to the switch in input mode between the plurality of image signals IS1 and IS2 and a first transistor T1 which outputs a first reset signal RS1 to the interfacing unit 340 according to the reset control signal RCS.

For example, in the wireless input mode, the interfacing unit 340 may receive the first image signal IS1 and may output the image data RGB converted from the first image signal IS1. In the USB input mode, the interfacing unit 340 may receive the second image signal IS2 and may output the image data RGB converted from the second image signal IS2. When the switch in input mode between the first and second image signals IS1 and IS2 occurs, the first reset controlling unit 344 may reset the interfacing unit 340 using a bus signal VBUS of about 5V which is determined as a standard input/output inputted with the second image signal IS2 in the USB input mode. When the interfacing unit 340 has an integrated circuit (IC), a general purpose input output (GPIO) of IC may be used as a reset input terminal for the first reset signal RS1.

When the one of the plurality of image signals IS1 and IS2 stops, the second reset controlling unit 346 may reset the display panel 320 by blocking the panel power VPP to prevent noises of the display panel 320. The second reset controlling unit 346 may include a panel power switching part which generates a second reset signal RS2 by transmitting or blocking the panel power VPP and a switching controlling part which adjusts the panel power switching part according to the panel power enable signal PPE.

For example, the panel power switching part may include a second transistor T2 of a positive type and a first resistor R1, and the switching controlling part may include a third transistor T3 of a negative type and a second resistor R2. The first resistor R1 is connected between a gate and a source of the second transistor T2. The source of the second transistor T2 is connected to a first input terminal of the second reset controlling unit 346 for the panel power VPP and a drain of the second transistor T2 is connected to a first output terminal of the second reset controlling unit 346 for the reset signal RS. In addition, the second resistor R2 is connected between a gate of the third transistor T3 and a ground voltage terminal. A source of the third transistor T3 is connected to the ground voltage terminal and a drain of the third transistor T3 is connected to the gate of the second transistor T2. The gate of the third transistor T3 is connected to a second input terminal of the second reset controlling unit 346 for the panel power enable signal PPE.

For example, in the USB input mode, the interfacing unit 340 may receive the second image signal IS2 and may output the image data RGB converted from the second image signal IS2. In addition, the interfacing unit 340 may generate the panel power enable signal PPE corresponding to a BUS signal VBUS of about 5V which is determined as a standard input/output inputted with the second image signal IS2 in the USB input mode and may output the panel power enable signal PPE to the second reset controlling unit 346. When the input of the second image signal IS2 abnormally stops, the second reset controlling unit 346 may reset the display panel 320 using the panel power enable signal PPE.

In the display device 310 according to the third embodiment, when the input of the image signals is switched, the interfacing unit 340 is reset by the first reset controlling unit 344 and both the first and second image signals IS1 and IS2 coexisting in the interfacing unit 340 are eliminated. Accordingly, the errors are prevented in the conversion process to the image data RGB and deterioration such as a flicker is prevented. In addition, display quality of the display device 310 is improved.

Further, when the input of the image signals abnormally stops, the display panel 320 is reset by the second reset controlling unit 346 and a residual image of a previous frame is not displayed in the display panel 320. Accordingly, deterioration such as a noise is prevented and display quality of the display device 310 is improved.

In the first to third embodiments, the display device may include a flat panel display (FPD) such as a liquid crystal display (LCD) device, an organic light emitting diode (OLED) display device, a plasma display panel (PDP) and a field emission display (FED) device or a cathode ray tube (CRT).

Consequently, when the input of the image signals is switched or stops in the display device according to the present disclosure, deterioration such as a flicker and a residual image is prevented and display quality is improved by resetting the interfacing unit or the display panel.

It will be apparent to those skilled in the art that various modifications and variations can be made in a display device including a reset controlling unit and a method of driving the display device of the present disclosure without departing from the spirit or scope of the invention. Thus, it is intended that the present invention covers the modifications and variations of this invention provided they come within the scope of the appended claims and their equivalents.

What is claimed is:

1. A display device, comprising:
   an interfacing unit that converts one of a plurality of image signals inputted according to a switch among a plurality of input modes into an image data, wherein at least one of the plurality of image signals is accompanied by a control signal when the at least one of the plurality of image signals is inputted into the interface unit, and wherein the control signal has a high level voltage while at least one input mode is a universal serial bus input mode for the display device to receive an image signal through a universal serial bus, and wherein the control signal has a low level voltage smaller than the high level voltage while the at least one input mode is a wireless input mode for the display device to receive a wireless image signal;
   a first reset controlling unit that receives the control signal when the at least one of the plurality of image signals is inputted to the interfacing unit and that generates and sends a first reset signal to the interfacing unit in synchronization with a rising timing and a falling time of the control signal to reset the interfacing unit, wherein the first reset signal is in a pulse form and is generated at each of a rising time of the control signal and at a falling time of the control signal;
   a driving unit that converts the image data into a data signal;
   a display panel that displays an image using the data signal; and
   a panel power unit that supplies a panel power to the driving unit and the display panel.

2. The display device according to claim 1, wherein the first reset controlling unit comprises:
   a reset control signal generating unit that generates the first reset control signal when the switch among the plurality of input modes occurs; and
   a first transistor that outputs the first reset signal to the interfacing unit, the first reset signal resetting the interfacing unit according to the reset control signal.

3. The display device according to claim 1, wherein the plurality of image signals coexisting in the interfacing unit are eliminated when the interfacing unit is reset.

4. The display device according to claim 1, further comprising a second reset controlling unit that resets the display panel by blocking the panel power according to a stop of an input of one of the plurality of image signals.

5. The display device according to claim 4, wherein the second reset controlling unit comprises:
   a second transistor that outputs a second reset signal by one of transmitting and blocking the panel power; and
   a third transistor that adjusts an output of the second transistor according to a panel power enable signal corresponding to the stop of the input of the one of the plurality of image signals.

6. The display device of claim 1, wherein the first reset controlling unit provide a ground voltage as the first reset signal to the interfacing unit.

7. A display device, comprising:
   an interfacing unit that converts one of a plurality of image signals inputted according to a switch among a plurality of input modes into an image data, wherein at least one of the plurality of image signals is accompanied by a control signal when the at least one of the plurality of image signals is inputted to the interfacing unit, and wherein the control signal has a first high level voltage while at least one input mode is a universal serial bus input mode for the display device to receive an image signal through a universal serial bus, and the control signal has a first low level voltage smaller than the first high level voltage while the at least one input mode is a wireless input mode for the display device to receive a wireless image signal;
   a driving unit that converts the image data into a data signal;
   a display panel that displays an image using the data signal;
   a panel power unit that supplies a panel power to the driving unit and the display panel; and
   a reset controlling unit that is disposed between the panel power unit and the display panel,
   wherein the interfacing unit outputs a panel power enable signal to the reset controlling unit when the interfacing unit receives an input of one of the image signals and outputs no panel power enable signal when the interfacing unit receives no input of one of the image signals, and
   wherein the panel power enable signal controls a power supply path from the panel power unit through the reset controlling unit to the driving unit and the display panel, the power supply path through the reset control unit is blocked when the interfacing unit receives no input of one of the plurality of image signals and outputs no panel power enable signal to the reset controlling unit, wherein the panel power enable signal is in synchronization with the control signal.

8. The display device according to claim 7, wherein the reset controlling unit comprises:
a first transistor that outputs a reset signal by one of transmitting and blocking the panel power; and
a second transistor that adjusts an output of the first transistor according to the panel power enable signal corresponding to the stop of the input of the one of the plurality of image signals.

9. The display device according to claim 8, wherein the panel power enable signal is outputted from the interfacing unit.

10. The display panel of claim 7, wherein the reset controlling unit includes a first switching transistor, wherein the first switching transistor has a source electrode connected to the panel power unit, a drain electrode connected to the driving unit, and a gate electrode connected to the interfacing unit.

11. The display panel of claim 10, wherein the reset controlling unit further includes a second switching transistor having a source electrode connected to a ground voltage terminal, a drain electrode connected to the gate electrode of the first switching transistor, and a gate electrode connected to the interfacing unit.

12. The display device of claim 7, wherein the panel power enable signal has a second high level voltage while the control signal has the first high level voltage and the panel power enable signal has a second low level voltage smaller than the second high level voltage while the control signal has the first low level voltage.

13. A method of driving a display device, comprising:
converting one of a plurality of image signals inputted according to a switch among a plurality of input modes into an image data by an interfacing unit, wherein at least one of the plurality of image signals is accompanied by a control signal when the at least one of the plurality of image signals is inputted into the interface unit, and wherein the control signal has a high level voltage while at least one input mode is a universal serial bus input mode for the display device to receive an image signal through a universal serial bus, and the control signal has a low level voltage smaller than the high level voltage while the at least one input mode is a wireless input mode for the display device to receive a wireless image signal;
generating and sending a reset signal in a pulse form to the interfacing unit to reset the interfacing unit at each of a rising time and a falling time of the control signal when the switch among the plurality of input modes occurs to eliminate the plurality of image signals coexisting in the interfacing unit by a reset controlling unit;
converting the image data into a data signal by a driving unit;
displaying an image using the data signal by a display panel; and
supplying a panel power to the driving unit and the display panel by a panel power unit.

14. A method of driving a display device, comprising:
converting one of a plurality of image signals inputted according to a switch among a plurality of input modes into an image data by an interfacing unit, wherein at least one of the plurality of image signals is accompanied by a control signal when the at least one of the plurality of image signals is inputted into to the interfacing unit, and wherein the control signal has a first high level voltage while at least one input mode is a universal serial bus input mode for the display device to receive an image signal through a universal serial bus, and the control signal has a first low level voltage smaller than the first high level voltage while the at least one mode is a wireless input mode for the display device to receive a wireless image signal;
converting the image data into a data signal by a driving unit;
displaying an image using the data signal by a display panel;
controlling a power supply path from a panel power unit through a reset controlling unit to the driving unit and the display panel by a panel power enable signal,
wherein a panel power is supplied from the panel power unit through the reset controlling unit to the driving unit and the display panel when the interfacing unit outputs the panel power enable signal to the reset controlling unit upon receiving an input of the one of the image signals, and
the panel power supply path is blocked when the interfacing unit outputs no panel power enable signal to the reset controlling unit upon receiving no input of one of the plurality of image signals,
wherein the panel power enable signal is in synchronization with the control signal.

* * * * *